United States Patent
Haines et al.

(10) Patent No.: US 6,295,423 B1
(45) Date of Patent: Sep. 25, 2001

(54) METHODS AND SYSTEMS FOR MONITORING CONSUMABLE ITEM LIFETIMES FOR PERIPHERAL UNITS

(75) Inventors: Robert E. Haines; Santiago Rodriguez; Joseph L. Burquist, all of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/480,543

(22) Filed: Jan. 10, 2000

Related U.S. Application Data

(63) Continuation-in-part of application No. 09/410,989, filed on Oct. 1, 1999.

(51) Int. Cl.[7] .................................................. G03G 21/00
(52) U.S. Cl. .................................................. 399/24; 399/9
(58) Field of Search ........................... 399/24–29, 9, 399/11, 43

(56) References Cited

U.S. PATENT DOCUMENTS

| | | | |
|---|---|---|---|
| 4,771,313 | 9/1988 | Kuroda et al. | 355/3 R |
| 4,963,927 | 10/1990 | Ishihara | 355/207 |
| 5,021,828 | 6/1991 | Yamaguchi et al. | 355/209 |
| 5,066,978 | 11/1991 | Watarai et al. | 355/206 |
| 5,204,698 | 4/1993 | LeSueur et al. | 346/160 |
| 5,206,685 | 4/1993 | Hara et al. | 355/206 |
| 5,749,023 | 5/1998 | Grace et al. | 399/58 |
| 5,778,279 | 7/1998 | Kawai et al. | 399/42 |
| 5,794,094 | 8/1998 | Boockholdt et al. | 399/27 |
| 5,815,768 | 9/1998 | Clifton | 399/27 |
| 5,862,431 | 1/1999 | Christensen | 399/27 |
| 5,887,232 | 3/1999 | Phillips et al. | 399/262 |

*Primary Examiner*—Quana M. Grainger

(57) ABSTRACT

Methods and apparatus for generating notifications associated with the lifetime of peripheral unit consumables are described. In the described embodiments, users or clients are able to define and adjust their own threshold values that are associated with a consumable's lifetime. In one embodiment, a lifetime monitoring mechanism is provided and monitors the lifetime of a peripheral unit consumable that is associated with operation of the peripheral unit. The lifetime monitoring mechanism is configured with a user-manipulable, threshold-defining mechanism that is configured to receive user input and, responsive to the user input, define a threshold value for the lifetime monitoring mechanism. The peripheral unit's use of the consumable is monitored using the lifetime monitoring mechanism. A determination is made when the peripheral unit's use of the consumable reaches the threshold value and, responsive thereto, a notification is generated.

20 Claims, 4 Drawing Sheets

METHODS AND SYSTEMS FOR MONITORING CONSUMABLE ITEM LIFETIMES FOR PERIPHERAL UNITS

CROSS REFERENCE TO RELATED APPLICATIONS

This application is a continuation in part of co-pending U.S. application Ser. No. 09/410,989 filed Oct. 1, 1999.

TECHNICAL FIELD

The present invention relates to peripheral units such as laser printers and the like. More particularly, the invention concerns systems and methods for monitoring the lifetime of various components of such peripheral units and generating notifications in a manner that can be defined by a user or client of the peripheral unit.

BACKGROUND

Peripheral tinits come in many shapes and sizes and are typically configured for use with a computer or in a networked environment comprising a plurality of computers. Examples of peripheral units include printers, such as laser printers, facsimile machines, copiers, and the like. Peripheral units typically have individual constituent components that themselves have a finite lifetime. These constituent components are referred to in this document as a "consumable". When the lifetimes of such components have expired, they must be replaced. Replacing used components often times means that the peripheral unit must go offline for a period of time so that the component can be replaced. This, in turn, can adversely affect productivity insofar as the peripheral unit cannot often be used during these down times. Further adversely affecting productivity is the fact that some components must be special ordered because they are not kept on hand. In addition, some components may require a specialized technician for proper installation. Thus, it has become desirable to ascertain, in advance, when particular components of a peripheral unit ,ire approaching the end of their useful lifetime. In this manner, users of the peripheral unit can take measures to ensure that appropriate replacement components arc on hand thereby reducing the peripheral unit's downtime.

There have been efforts in the past to develop systems and methods for ascertaining the useful lifetime of a component of a peripheral unit. In the context of peripheral units that comprise laser printers, an example includes a sensor for sensing the toner that is utilized by the laser printer. Exemplary systems are disclosed in U.S. Pat. Nos. 5.862,431, 5,815,768, and 5,794,094, the disclosures of high are incorporated by reference herein. These and other systems typically monitor the toner. When the toner level reaches a predetermined, hardwired threshold, a notification can be generated that the toner is low. The notification can be manifest in the form of a printer panel indicator.

One problem that is associated with past systems and methods for detecting consumable lifetimes is that they are typically inflexible. Specifically, they do not enable a user or client to set their own thresholds for determining when a consumable component is approaching the end of its useful lifetime. There are many factors that can affect the lifetime of consumable component. For example, some components may have a history of lasting longer or shorter than the lifetimes that are indicated by the components' specifications. Additionally, the use frequency of the peripheral unit can most definitely affect the rate at Which the component wears out. Specifically, peripheral units that experience a higher rate of use have components that wear out quicker than peripheral units that experience a lower rate of use. In addition to factors that affect the lifetime of a consumable component, other factors can contribute to the down time that is experienced by the peripheral unit when a component wears out. Specifically, product lead times can adversely affect downtime. Specifically, if a particular component must be ordered for replacement, and it typically takes one day to order and receive a component, then there will most certainly be a down time of one day when the component expires.

This invention arose out of concerns associated with providing improved methods and systems for monitoring the lifetime of various components of peripheral units and generating notifications when one or more of the components is approaching the end of its useful lifetime.

SUMMARY

Methods and apparatus for generating, notifications associated with the lifetime of peripheral unit consumables ire described. In the described embodiments, users or clients are able to define and adjust their own threshold values that are associated with with a consumable's lifetime. This provides flexibility insofar as being able to consider circumstances that are outside of those circumstances that directly bear upon the operation of the consumable, e.g. product lead times and the like.

In one embodiment, a lifetime monitoring mechanism is provided and monitors the lifetime of a peripheral unit consumable that is associated with operation of the peripheral unit. The lifetime monitoring mechanism is configured with a user-manipulable, threshold-defining mechanism that is configured to receive user input and, responsive to the user input, define a threshold value for the lifetime monitoring mechanism. The peripheral unit's use of the consumable is monitored using the lifetime monitoring mechanism. A determination is made when the peripheral unit's use of the consumable reaches the threshold value and, responsive thereto, a notification is generated.

In another embodiment, an image-forming apparatus is provided and its use of a consumable is monitored. Input is received from a client of the image-forming apparatus and, responsive thereto, a threshold value is defined that provides a measure of remaining consumable that is associated with operation of the image-forming apparatus. When the consumable reaches the threshold value, a notification is generated for the client.

In yet another embodiment, an image-forming system includes an image-forming apparatus that is configured to form images. A lifetime monitoring mechanism is operably associated with the image-forming apparatus and is configured to monitor the lifetime of an image-forming apparatus consumable that is associated with operation of the image-forming apparatus. A user-manipulable, threshold-defining mechanism is provided and is operably coupled with the lifetime monitoring mechanism. The threshold-defining mechanism is configured to receive user input and, responsive thereto, defines a threshold value for the lifetime monitoring mechanism. A warning generator is provided and is configured to generate a notification when the consumable that is associated with operation of the image-forming reaches the threshold value.

DETAILED DESCRIPTION

The description that is given below is given in the context of a peripheral unit comprising a laser printer. In addition, the particular consumable component that is discussed is the laser printer's toner that typically comes in a toner cartridge. It is to be understood that this constitutes but one example of a peripheral unit and one example of a consumable component for this particular peripheral unit. The principles discussed below have applicability to other peripheral units and other consumable components. For example, other consumable components of a laser printer can include fusers, ink cartridges, media levels, process cartridges, and drum life to name just a few.

Exemplary Network

Figure 1:
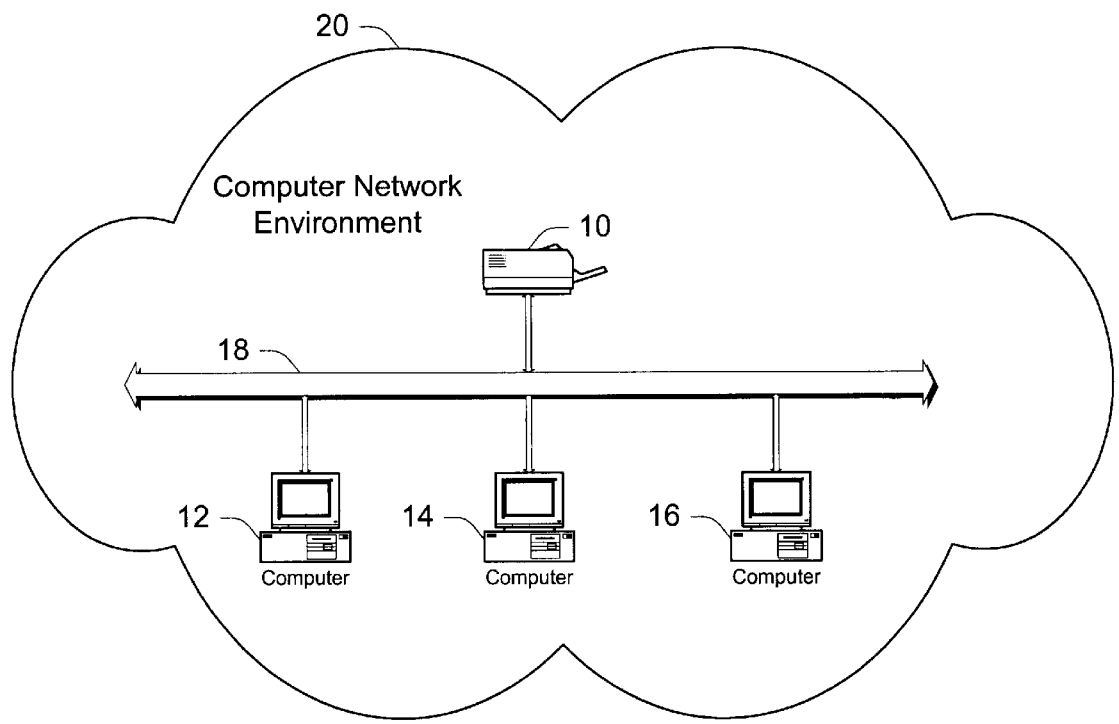
FIG. 1 is a high level schematic block diagram of a network operating environment having a printer that is adapted to carry out an apparatus and method in accordance with the invention.

FIG. 1 shows a peripheral unit in the form of an electrophotographic printing device, or printer, 10 for depositing laser generated images onto a piece of paper. Laser printer 10 is shown in a multiple user or client configuration wherein several computers 12, 14 and 16 are connected with printer 10 via an array of connections in the form of a network bus 18 of a computer network environment 20. In the context of this document, the terms "user" and "client" will be understood to include, without limitation, a computer or a human user or client. As shown, computer network environment 20 is in the form of a local area network, although any network environment, e.g. the internet, can be used. Any one of computers 12, 14 and 16 can send a print job to printer 10 with each printer having a printer driver (not shown) for 10 formatting a print job for delivery to printer 10.

Figure 2:
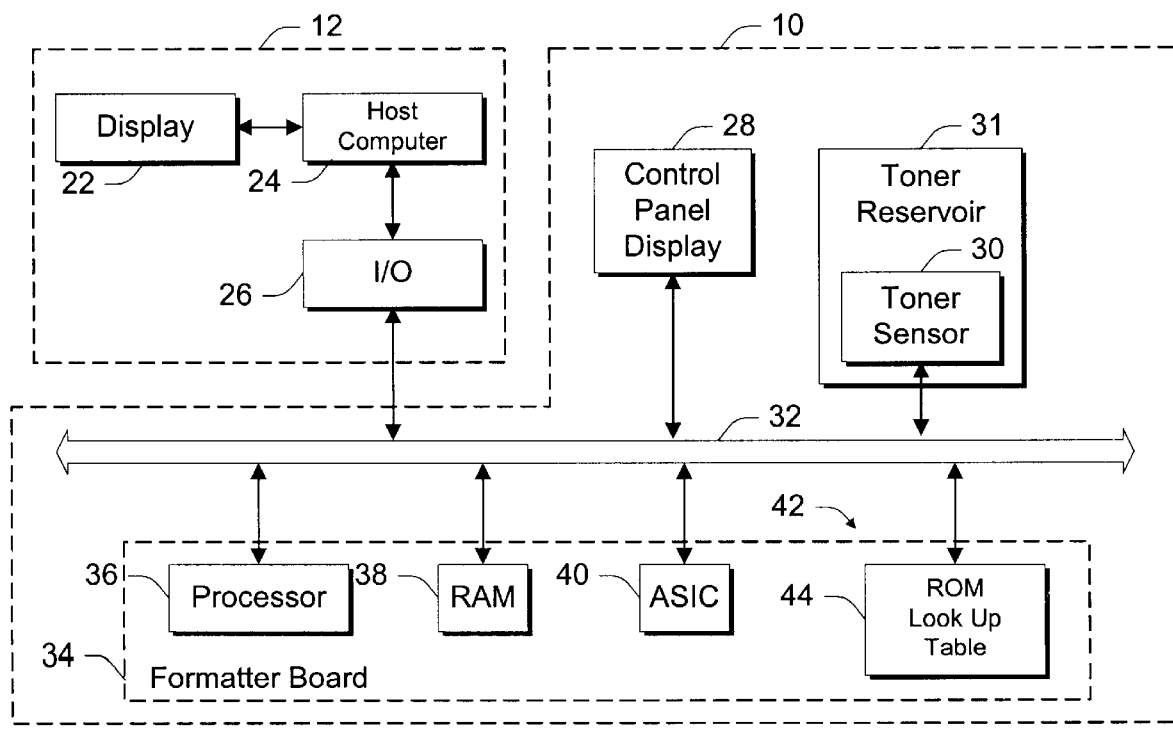
FIG. 2 is a block diagram illustrating in further detail various components of a computer and printer configured to implement an embodiment of the invention.

FIG. 2 shows printer 10 and computer 12 in more detail. Computer 12 includes a display 22, a host computer 24 including a motherboard having a central processing unit (CPU) and memory, Lind an input/output (I/O) port 26. Computer 12 connects to printer 10 via a separate I/O port (not shown) of the printer and a bus 32. Printer 10 includes a bus 32 that forms the internal control paths for communication between various devices of printer 10. For example, a control panel display 28, a toner sensor 30, a formatter board 34, and ROM 42 communicate via bus 32. Bus 32 includes a data bus, an address bus, a control bus, and a supply voltage from a power supply (not shown).

Formatter board 34 prepares printer 10 to communicate data with computer 12 and includes a processor 36, RAM 38, ASIC computer chip 40, and ROM 42. ROM 42 is used to store a look-up table 44 containing information about pixel information for a data stream defining particular print characteristics received from a print job of a computer 12. Optionally, look-up table 44 can contain information about laser modulation to achieve particular print characteristics, with each printer having its own calibration of toner use. For example, look-up table 44 can contain laser modulation information defining toner use such as half modulation, quarter modulation, etc. Additionally, or alternatively, look-up table 44 can be provided on ASIC 40. In operation, formatter board 34 translates Printer Control Language (PCL) code, taking the code and splitting it into different data streams. Typically, most of the printer memory is located on formatter board 34. The PCL code formats gray scale levels for a laser printer, via a binary data stream mode, or optionally, via a laser pulse modulation mode. Similarly, the PCL code formats the distribution of colors for a color printer.

Printer 10 includes a print engine (not shown) which forms the main working assembly. A print job is sent by computer 12 via I/O 26 to printer 10 in the form of a data stream that defines how many pixels, as well as the location of the pixels, within each page of a document that is to be printed. Accordingly, this pixel amount and location information is provided in the form of a pixel array that is mapped to each page to be printed.

Exemplary Lifetime Monitoring Mechanisms

In the described embodiment, a lifetime monitoring mechanism is provided and monitors the lifetime of a peripheral unit consumable. In the specifically-discussed example, the peripheral unit comprises a laser printer and the lifetime monitoring mechanism is provided in the form of a toner sensor. It will be appreciated, however, that the described toner sensor constitutes but one example of a lifetime monitoring mechanism and is not intended to limited the invention to only toner sensors or, for that matter, to only peripheral units comprising laser printers.

An exemplary tonier sensor 30 is provided for use with a toner reservoir 31 of printer 10 for detecting the toner level present within reservoir 31. It is to be appreciated that any type of toner sensor can be used in this context, including but not limited to artificial intelligence-based sensors, optical density sensors and capacitive. In addition, although the toner sensor 30 is shown as being incorporated inside the reservoir 31, it is to be understood that it could be located outside of the reservoir as in the case of an optical density sensor or artificial intelligence-based sensor. An example of an artificial intelligence-based sensor is disclosed in U.S. Pat. No. 5,794,094, incorporated by reference above.

A typical optical sensor can be formed by an array of emitters and detectors that measure incremental levels of toner present within toner reservoir 31. According to one construction, a reflective element is supported within toner reservoir 31, adjacent a viewing window. An array of light sources, or emitters, are provided outside of the toner cartridge and within a cavity in the printer that receives the cartridge, alongside the cartridge viewing, window. Additionally, an array of detectors are provided adjacent to the array of emitters. Light passes from the emitters, through the window, and reflects off the reflective element. Reflected light then passes out the window to be detected by an associated detector, wherein the lack of a detected reflection indicates the presence of toner within the cartridge reservoir at that particular level since it obstructs the reflector. In this manner, toner can be detected at various elevational locations within toner reservoir 31, those emitters not visible with an associated detector being obscured with toner. The degree of obstruction of light from the emitters being detected with the detectors so as to indicate the toner level in increments. Optionally, a pair of windows can be provided in a toner cartridge one at each end, with an array of elevationally positioned emitters supported outside the cartridge at one end, and an associated array of detectors positioned elevationally outside the other end of the cartridge.

Toner sensor 30 can, illiterately, be provided completely within toner reservoir 31. For example toner sensor 30 can be formed from in array of wire sensors, each wire scissor being positioned at a unique elevational position within toner reservoir 31 for sensing the presence of toner at each respective level.

Operation of an Exemplary Laser Printer

The description given just below is intended as a high level description of the operation of a laser printer that can be used in accordance with the described embodiment. According to the laser printer implementation, an electrophotographic printer utilizes a solid-state laser which scans across and exposes a photoconductor drum creating a latent image on the photoconductor drum. Subsequently, a powder toner cartridge deposits toner along the latent image of the drum. A toner cartridge of printer 10 delivers electrostatically charged powder toner particles (either black or colored) to a charged latent image on a photoconductor surface of a photoconductor drum, developing the photoconductor where the particles selectively adhere to appropriately charged regions. A charging corona, or optionally a charge transfer roller, charges the back side of a paper such that toner is transferred from the photoconductor drum to the paper where the paper and drum contact in the region of the charging corona. Subsequently, a fusing station thermally fuses the transferred powder toner to the paper. Finally, a cleaning station cleans any residual toner from the surface of photoconductor drum, enabling reinitiation of the cycle beginning with a process initiation point. Especially for the case of mono component development as used in low end printers, a toner cartridge forms a replaceable toner/developer cartridge which enables a user to replace toner when the cartridge has been emptied. The cartridge enables relatively quick and easy toner replacement by a user. Such a replaceable toner cartridge for use in a printer includes a cartridge housing typically formed from plastic material. A separate memory can be provided on the toner cartridge for temporarily, or even permanently, storing information about toner levels detected by the sensor, as spell as pixel count information used to describe print job characteristics of users. A toner supply reservoir is formed within the housing where a supply of powdered toner is stored for later use. A metering blade co-acts Wraith a developer roll to deliver a metered amount of powdered toner along a developer roll where it is transferred to the surface of the photoconductor drum alone charged regions. The developer roll preferably comprises a rotating toner/development roll having appropriate charging properties that are employed to charge the toner by way of touch and rubbing contacts. Accordingly, the toner electrostatically adheres to the roll along which it is transported to contact the photoconductor drum at the nip of the drum and roll. Optionally, the toner/development roll is separated from the photoconductor drum by a gap, the toner jumping the gap via charge jumping to transfer to the drum. In the presence of a charge-biased development field, delivered toner is selectively transferred to those areas of the photoconductor drum having an opposite sign charge.

User-Configurable Threshold-Defining Mechanism

Figure 3:
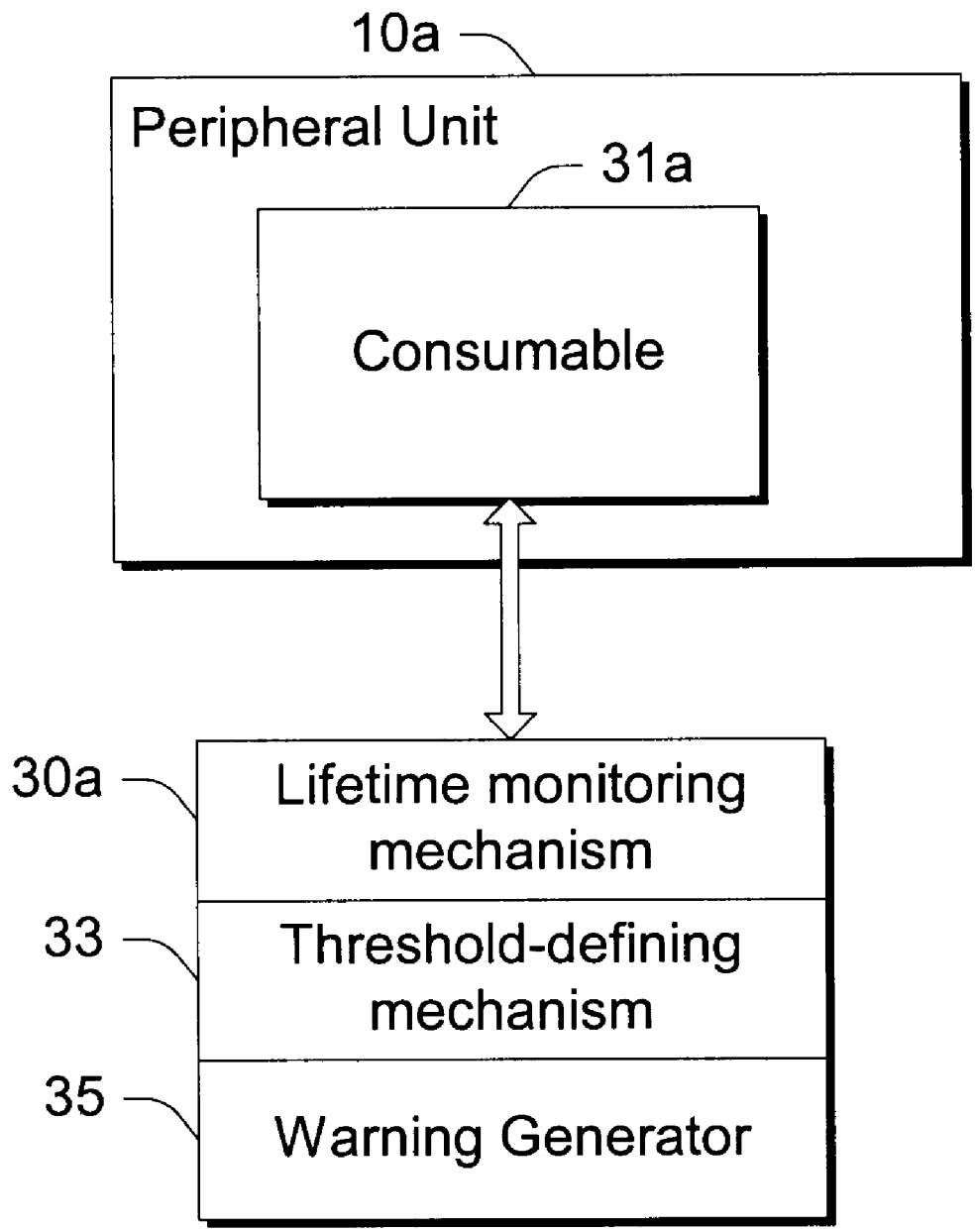
FIG. 3 is a high level block diagram of a peripheral unit system in accordance with the described embodiment.

FIG. 3 shows a peripheral unit 10a that embodies a consumable 31a. Peripheral unit 10a can be any suitable peripheral unit, with an exemplary peripheral unit having been described above in connection with FIGS. 1 and 2. A lifetime monitoring mechanism 30a is provided and is configured to monitor the lifetime of a consumable item that is associated with the operation of the peripheral unit. A threshold-defining mechanism 33 is configured with the lifetime monitoring mechanism to provide a user-manipulable mechanism that a user can use to change Li threshold value that is measured by the lifetime monitoring mechanism 30a. The threshold-defining mechanism receives user input and, responsive thereto, defines a threshold value for the lifetime monitoring mechanism. A Warning generator 35 is provided and is operatively connected with the threshold-defining mechanism 33 and the lifetime monitoring mechanism for generating a warning when the threshold value that has been set by the user has been reached.

The threshold-defining mechanism 33 can be implemented in any suitable hardware, software, or firmware. For or example, mechanism 33 can comprise a software program having computer readable instructions which, when implemented, determine when a certain threshold value has been reached and, accordingly, generate a notification for the user that the consumable has reached its user-defined threshold value. Such a program might be stored in the peripheral unit's memory, e.g. RAM 38 (FIG. 2).

Figure 4:
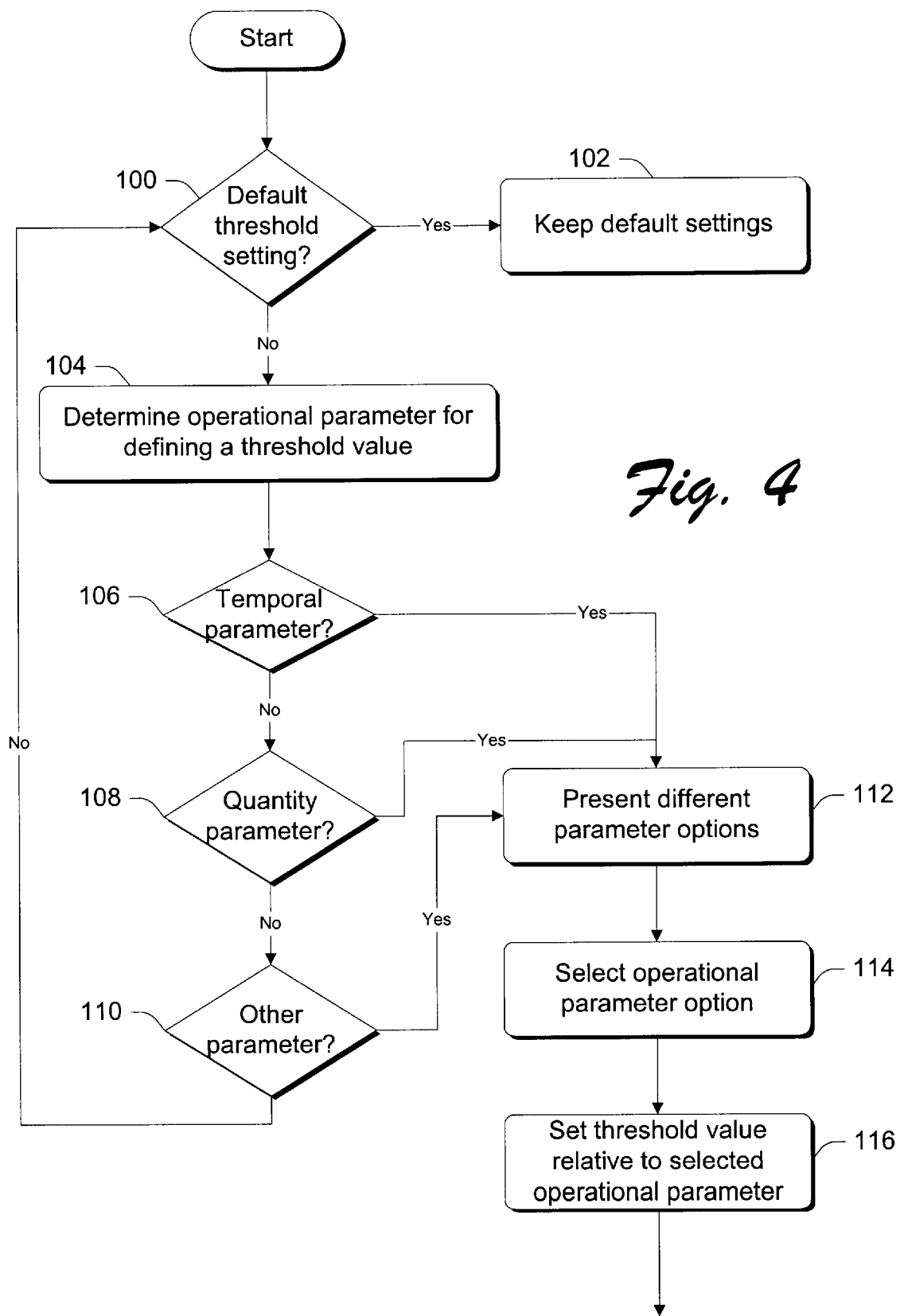
FIG. 4 is a flow diagram that describes steps in a method in accordance with the described embodiment.
Figure 5:
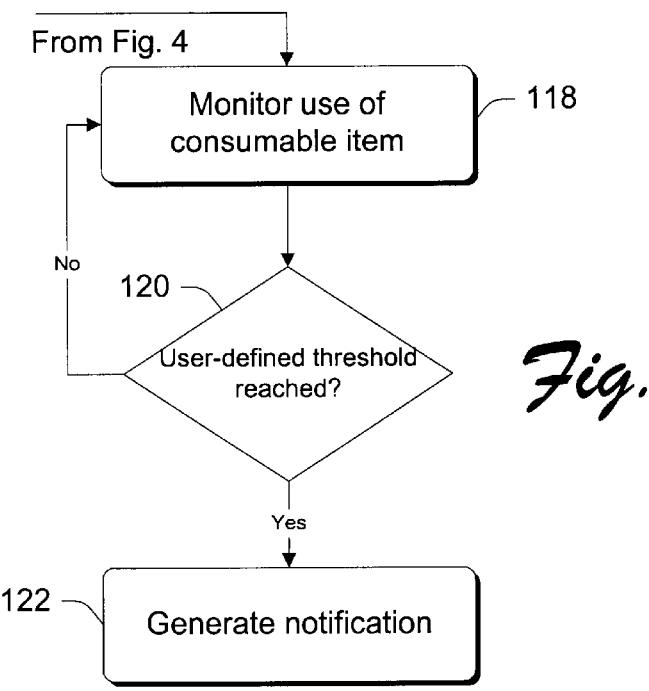
FIG. 5 is a flow diagram that is a continuation of the FIG. 4 flow diagram and describes steps in a method in accordance with the described embodiment.

FIGS. 4 and 5 are now diagrams that describe steps in a method in accordance with the described embodiment. Step 100 determines whether a user wishes to retain a threshold value for the consumable of interest or set their own threshold value. For example, a user-interface such as a printer control panel interface and display 22 (FIG. 2) can query the users as to their preferences. It the user desires to retain default threshold values, then step 102 keeps the default setting. If, on the other hand step 100 determines that a user wishes to change the default threshold setting, then step 104 determines an operational parameter for defining a threshold value. Step 104 allows a user to define or set a threshold value in terms of one of a plurality of different operational parameters of the consumable. For example, operational parameters for consumable items can include so-called temporal parameters, quantity parameters, or other user-definable parameters. Examples of temporal parameters include those that have a time element associated with them. Here, a user might opt to set a threshold value based upon an estimate of how much longer a consumable can be used given current use rates, i.e. generate a notification when 2-days of consumable are left at current use rates. Quantity parameters include those that have a quantity associated with them. Here, a user might opt to set a threshold value based upon a percentage of remaining consumable, i.e. generate a notification when ten percent of the consumable remains. Accordingly, steps 106, 108, and 110 determine which operational parameter a user has selected. If the user does not select a specific operational parameter, then the method loops back to step 100. If the user does select an operational parameter, then step 112 presents different parameter options that can be used to define the threshold value. For example, Table 1 below gives exemplary parameter options for the temporal and quantity parameters.

TABLE 1

| Parameter | Parameter Option |
|---|---|
| Temporal | Estimated days remaining |
| Temporal | Estimated hours remaining |

TABLE 1-continued

| Parameter | Parameter Option |
|---|---|
| Temporal | Days in use |
| Quantity | Gross amount remaining |
| Quantity | Gross amount used |
| Quantity | Percentage amount remaining |

Here, there are three parameter options for each of the parameters. For the temporal parameter, a riser can define their threshold value in terms of estimated days or hours remaining. Additionally, a user can define their threshold value in terms of the number of days a consumable has been in use. For the quantity parameter, a user can define their threshold value in terms of gross amount of consumable remaining gross amount of consumable used, or percentage amount of consumable remaining. It will be appreciated that the above constitute specific examples and are not intended to limit the invention in any way.

Thus, having selected an operational parameter (steps 106, 108, 110), step 114 selects one of the parameter options that can be used to define the threshold value. Having selected the parameter option, step 116 sets the threshold value relative to the selected operational parameter. Here, the user is given the opportunity to set specific numeric values for the threshold value. Thus, if a user selects the "Quantity" parameter and the "Percentage amount remaining" parameter option, they might set a specific numeric value of ten percent. Thus, a warning would be generated when the remaining percentage amount of the consumable item of interest is ten percent.

FIG. 5, which is a continuation of FIG. 4, shows exemplary steps in a monitoring method in accordance with the described embodiment. Step 118 monitors use of the consumable item of interest. Step 120 determines whether the user-defined threshold value has been reached. If it has not been reached, step 120 loops back to step 118. If, on the other hand, the user-defined threshold value has been reached, then step 122 generates an appropriate notification. Notifications can be generated in any suitable way. For example, notifications can be generated electronically and sent to the user, e.g. via email or other similar notification, or can be generated and displayed by the peripheral unit. e.g. on the printer display panel, that is using the consumable of interest.

Artificial Intelligence Embodiment

Figure 6:
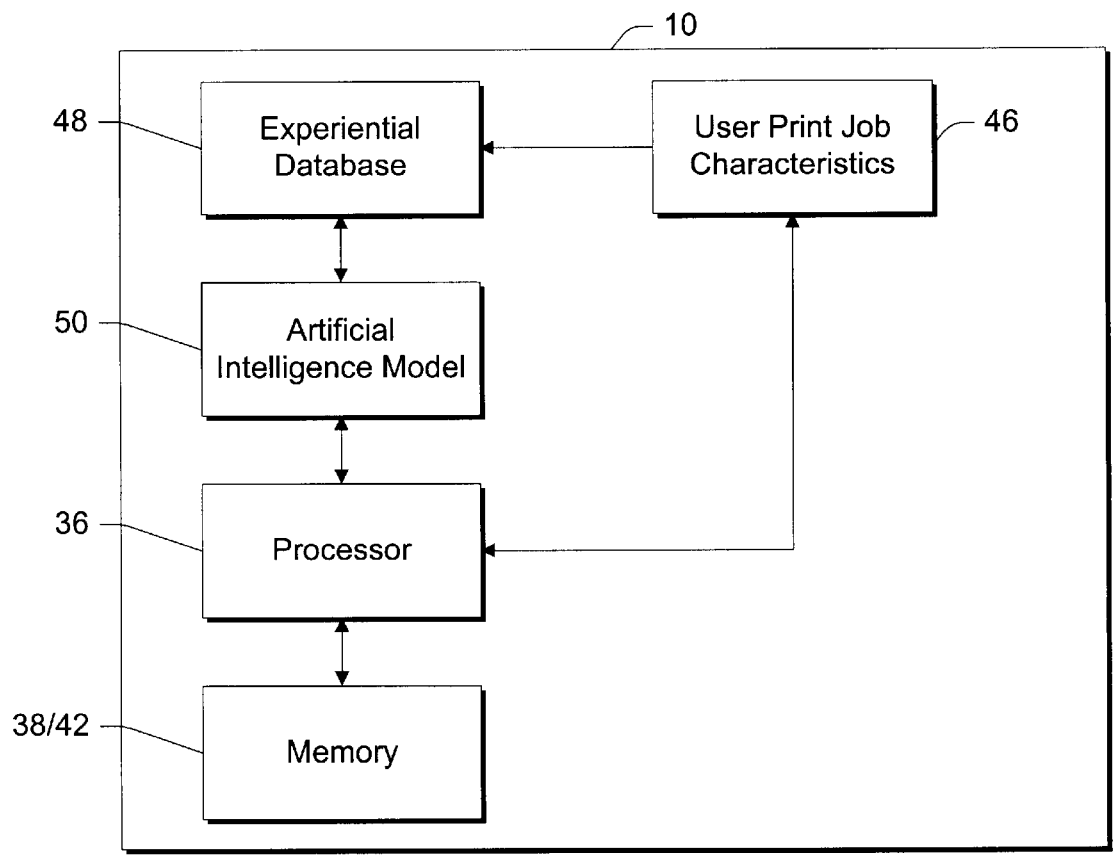
FIG. 6 is a high level block diagram of a system in accordance with one embodiment of the invention.

One aspect of the described invention incorporates an artificial intelligence model as a lifetime monitoring mechanism. FIG. 6 shows an exemplary implementation of an artificial intelligence model in conjunction with a peripheral unit comprising a laser printer 10.

In this example, printer 10 includes a processor 36, memory 38/42, an experiential database 48, an artificial intelligence model 50, and user print job characteristics 46. These components arc arranged to provide a pixel counting function that provides a way of determining when toner might be low. User print job characteristics 46 comprise print job characteristics compiled from previous print jobs and/or user experiential print job data. Experiential database 48 is compiled over a period of use and time by users and/or computers indicating the print job characteristics for each user and/or computer. Experiential database 48 can contain historical information about the number of pixels used per page of printed text/graphics as compiled from each print job implemented during a particular toner cartridge's lifetime. Even further, usage from previous toner cartridges can also be used to collect such historical information. Such experiential data can then be used to make projections about how much toner will be used during a remaining portion of capacity, or life, of a toner cartridge. For example, information about particular print jobs can be correlated with the source of the job in order to make predictions, and/or define trends, that predict the level of toner that will be needed to print jobs that will later be received from that particular job source during use of the remaining lifetime of a toner cartridge.

Artificially intelligence model 50 then further combines information about characterized print jobs and/or users in order to make accurate estimates of toner level, and also make predictions about the toner level needed to carry out remaining and/or future print jobs.

One simple artificial intelligence model 50 merely adds up the pixel count information for each printed page and each user to arrive at an average, overall pixel count per printed page. Processor 36, user print job characteristics 46, experiential database 48 and artificial intelligence model 50 combine to form a toner level feedback system, with a pixel counter (not shown) providing the source or experiential data for database 48 and print job characteristics 46.

Artificial intelligence model 50, in another simplified implementation, can be formed as a set of simple algebraic equations that combine the toner use trends for each print job and/or user in the experiential database. For example, the average number of pixels used per par,e from print jobs emanating from a particular user or computer (e.g. computers 12, 14, 16 in FIG. 1) can be monitored during the lifetime of a toner cartridge. Model 50 can then note the frequency with which print jobs are received from this particular user, and predict the frequency of use by the user during the remaining portion of cartridge use. The information learned from that user's print job characteristics 46, as collected in database 48 during a first portion of use, as well as other user's print job characteristics, are then combined in the artificial intelligence model 50 to enable a more accurate prediction of toner use during a last portion of cartridge use. For example predictions can be made base on future print jobs based upon knowledge of which users print which type of job during a weekly, and/or hourly work schedule, then correlating the associated pixel user based on characterization of the print jobs submitted by the user to the printer. With such information having been collected and processed, the model 50 can monitor the predicted lifetime of the consumable item and generate the appropriate notification when the user-defined threshold value is reached.

In this example, processor 36 and memory 38/42 can provide the basis or a programmed threshold-defining mechanism that enables a user to set incremental threshold values that are evaluated in light of the data developed by the artificial intelligence model 50.

The methods and systems described above provide a user with the ability to define their own threshold values for the lifetimes of consumable items of peripheral units. These user-defined threshold values are not hardwired as some threshold values have been in the past. Rather, a user is able, through the principles of the described invention, to set specific threshold values that can be defined in any number of ways. Additionally, threshold values are adaptable by virtue of the fact that they are user-definable. Accordingly, when use patterns change over time, users can adapt the threshold values to accommodate the changing patterns.

This can greatly facilitate replacement, reordering and restocking of the consumable items. This, in turn, can reduce downtimes that stem from not having replacement consumables on hand and read for replacement.

In compliance with the statute, the invention has been described in language more or less specific as to structural and methodical features. It is to be understood however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. In a peripheral unit, a method of generating a notification associated with the lifetime of a peripheral unit consumable associated with operation of the peripheral unit, the method comprising:

maintaining a lifetime monitoring mechanism that monitors the lifetime of a peripheral unit consumable that is associated with operation of the peripheral unit;

configuring the lifetime monitoring mechanism with a user-manipulable, threshold-defining mechanism that is configured to receive user input and responsive to said user input, define a threshold value for the lifetime monitoring mechanism;

monitoring the peripheral unit's use of the consumable with the lifetime monitoring mechanism;

determining when the peripheral unit's use of the consumable reaches the threshold value that is defined by the user input; and generating a notification when the consumable that is associated with operation of the peripheral unit reaches the threshold value.

2. The method of claim 1, wherein said configuring of the lifetime monitoring mechanism comprises configuring the lifetime monitoring mechanism to allow a user to define a threshold value in terms of one of a plurality of different operational parameters of the consumable or other item.

3. The method of claim 2, wherein one of the plurality of different operational parameters comprises a temporal parameter.

4. The method of claim 2, wherein one of the plurality of different operational parameters comprises a quantity parameter.

5. The method of claim 2, wherein the plurality of different operational parameters comprise at least:

a temporal parameter; and a quantity parameter.

6. The method of claim 1, wherein the lifetime monitoring mechanism comprises an artificial intelligence model.

7. In an image-forming apparatus, a method of generating a notification associated with the lifetime of a consumable associated with operation of the image-forming apparatus, the method comprising:

receiving input from a client of an image-forming apparatus;

responsive to said client's input, defining a threshold value that provides a measure of remaining consumable that is associated with operation of the image-forming apparatus;

monitoring the image-forming apparatus's use of a consumable that is associated with operation of the image-forming apparatus; and generating a notification for the client when the consumable that is associated with operation of the image-forming apparatus reaches the threshold value.

8. The method of claim 7, wherein said defining of the threshold value comprises defining said value in terms of a temporal parameter that is associated with operation of the consumable.

9. The method of claim 7, wherein said defining of the threshold value comprises defining said value in terms of a quantity parameter that is associated with operation of the consumable.

10. The method of claim 7 further comprising providing the client with an option to define said threshold value in terms of one of a plurality of different operational parameters of the consumable.

11. The method of claim 7, wherein said monitoring comprises using an artificial intelligence model to monitor the image-forming apparatus' use of the consumable.

12. The method of claim 7, wherein the consumable comprises a toner cartridge.

13. A computer-readable medium having computer-readable instructions thereon which, when executed by a computer, perform the steps of claim 7.

14. An image-forming system comprising:

an image-forming apparatus configured to form images;

a lifetime monitoring mechanism operably associated with the image-forming apparatus and configured to monitor the lifetime of an image-forming apparatus consumable that is associated with operation of the image-forming apparatus;

a user-manipulable, threshold-defining mechanism operably coupled with the lifetime monitoring mechanism and configured to receive user input and responsive to said user input, define a threshold value for the lifetime monitoring mechanism; and a warning generator configured to generate a notification when the consumable that is associated with operation of the image-forming reaches the threshold value.

15. The image-forming system of claim 14, wherein the threshold-defining mechanism comprises a plurality of settings that are defined in terms of a plurality of different operational parameters of the consumable.

16. The image-forming system of claim 15, wherein one of the operational parameters comprises a temporal parameter.

17. The image-forming system of claim 15, wherein one of the operational parameters comprises a quantity parameter.

18. The image-forming system of claim 14, wherein said lifetime monitoring mechanism comprises an artificial intelligence model that is configured to monitor the lifetime of the image-forming apparatus consumable.

19. The image-forming system of claim 18, wherein the artificial intelligence model is configured to monitor said lifetime in terms of one or more operational parameters that include a temporal parameter and a quantity parameter.

20. The image-forming system of claim 14, wherein said image-forming apparatus comprises a laser printer.

* * * * *